US010268235B2

(12) United States Patent
Lawrenson et al.

(10) Patent No.: US 10,268,235 B2
(45) Date of Patent: Apr. 23, 2019

(54) DEVICE FOR HANDHELD OPERATION AND METHOD THEREOF

(71) Applicant: Telefonaktiebolaget LM Ericsson (publ), Stockholm (SE)

(72) Inventors: Matthew John Lawrenson, Bussigny (CH); Lars Andersson, Solna (SE); Till Burkert, Huddinge (SE); Julian Charles Nolan, Pully (CH); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 396 days.

(21) Appl. No.: 14/908,917

(22) PCT Filed: Dec. 8, 2015

(86) PCT No.: PCT/EP2015/079038
§ 371 (c)(1),
(2) Date: Jan. 29, 2016

(87) PCT Pub. No.: WO2017/097348
PCT Pub. Date: Jun. 15, 2017

(65) Prior Publication Data
US 2018/0067518 A1 Mar. 8, 2018

(51) Int. Cl.
*H04M 1/00* (2006.01)
*G06F 1/16* (2006.01)
(Continued)

(52) U.S. Cl.
CPC .......... *G06F 1/1616* (2013.01); *G06F 1/1626* (2013.01); *G06F 1/1656* (2013.01);
(Continued)

(58) Field of Classification Search
CPC .... G06F 1/1656; G06F 1/1616; G06F 1/1626; G06F 1/1662; G06F 1/1684;
(Continued)

(56) References Cited

U.S. PATENT DOCUMENTS

2010/0151916 A1\* 6/2010 Baek ................ H04M 1/72519
455/567
2010/0283727 A1 11/2010 Jiang et al.
(Continued)

FOREIGN PATENT DOCUMENTS

JP 63272148 A 11/1988
WO 2008124335 A1 10/2008

OTHER PUBLICATIONS

Bandmann, V. et al., "Das Gecko Prinzip: Bioinspirierte Haftsysteme für die industrielle Anwendung", GIT-Labor—Portal für Anwender in Wissenschaft und Industrie (http://www.git-labor.de), Sep. 7, 2015, 1-4.
(Continued)

*Primary Examiner* — Nhan T Le
(74) *Attorney, Agent, or Firm* — Murphy, Bilak & Homiller, PLLC

(57) ABSTRACT

A device (100) for handheld operation, such as a mobile phone, a mobile terminal, a smartphone, a User Equipment (UE), a tablet, a phablet, a media player, a remote control, or a gaming console, is provided. The device is operative to detect an imminent or prevailing indication of an unstable operation of the device when being held by a hand (110) of a user of the device, and, in response thereto, to increase a grip between an outer surface (101, 103) of the device and one or more fingers (111-114) of the hand. The grip may, e.g., be increased by generating an adhesive force, or by increasing a friction, between the outer surface and the one or more fingers. Thereby, the risk for the user dropping the device is reduced, and a more convenient operation of the
(Continued)

device is achieved, in particularly if operated single-handedly.

35 Claims, 5 Drawing Sheets

(51) Int. Cl.
    *H04M 1/02*     (2006.01)
    *H04M 1/725*     (2006.01)
    *G06F 3/01*     (2006.01)
    *H04M 1/23*     (2006.01)

(52) U.S. Cl.
    CPC .......... *G06F 1/1662* (2013.01); *G06F 1/1684* (2013.01); *G06F 3/016* (2013.01); *H04M 1/0279* (2013.01); *H04M 1/72569* (2013.01); *G06F 2203/013* (2013.01); *G06F 2203/04809* (2013.01); *H04M 1/0281* (2013.01); *H04M 1/23* (2013.01)

(58) Field of Classification Search
    CPC .... G06F 2203/013; G06F 2203/04809; H04M 1/0279; H04M 1/0281; H04M 1/23; H04M 1/72569
    See application file for complete search history.

(56) References Cited

U.S. PATENT DOCUMENTS

| | | | |
|---|---|---|---|
| 2011/0057903 A1* | 3/2011 | Yamano | G06F 3/0237 345/174 |
| 2012/0218177 A1* | 8/2012 | Pang | G06F 3/0346 345/156 |
| 2014/0320420 A1* | 10/2014 | Ida | G06F 3/044 345/173 |
| 2016/0067136 A1* | 3/2016 | Raghavan | A61B 5/744 601/40 |

OTHER PUBLICATIONS

Bau, Olivier et al., "TeslaTouch: Electrovibration for Touch Surfaces", available online at: http://www.ivanpoupyrev.com/e-library/2010/teslatouchUIST2010.pdf, 2010, 1-10.

Hachisu, Taku et al., "VacuumTouch: Attractive Force Feedback Interface for Haptic Interactive Surface using Air Suction", CHI 2014, One of a CHInd, Toronto, ON, Canada Session: Force Input and Haptic Feedback, 2014, 1-10.

Hawkes, Elliot W. et al., "Grasping without Squeezing: Shear Adhesion Gripper with Fibrillar Thin Film", 2015 IEEE International Conference on Robotics and Automation (ICRA), Washington State Convention Center, Seattle, Washington, May 26-30, 2015, 1-8.

Biet, M. et al., "Implementation of tactile feedback by modifying the perceived friction", The European Physical Journal Applied Physics. DOI: 10.1051/epjap: 2008093, May 30, 2008, 123-135.

Minsky, H. K. et al., "Achieving enhanced and tunable adhesion via composite posts", Applied Physics Letters 106, 201604 (2015); doi: 10.1063/1.4921423, May 22, 2015, 1-5.

* cited by examiner

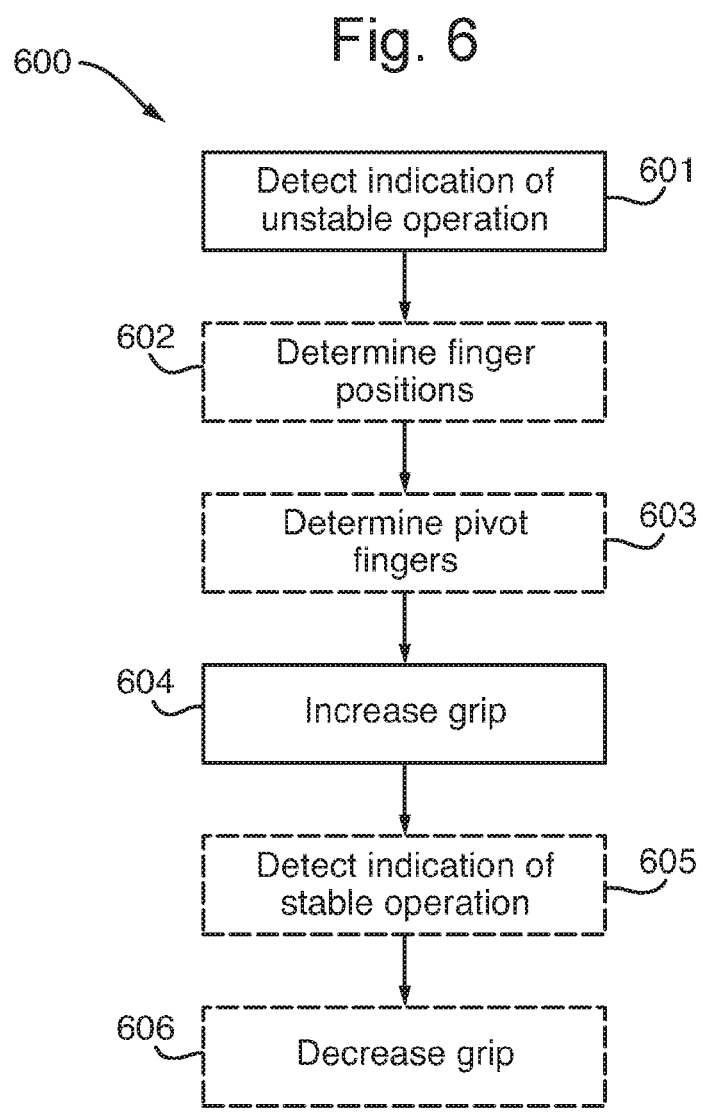

DEVICE FOR HANDHELD OPERATION AND METHOD THEREOF

TECHNICAL FIELD

The invention relates to a device for handheld operation, a method of a device for handheld operation, a corresponding computer program, and a corresponding computer program product.

BACKGROUND

The problems addressed herein relate to operating a handheld device, such as a smartphone or tablet comprising a touchscreen, with a single hand. The issues are particularly acute for a class of devices which exceed a certain size, colloquially termed 'phablets'. Such devices have a form factor between that of a smartphone and that of a tablet. The form factor was popularized by Samsung's Galaxy Note and now has many examples, including the Apple iPhone 6 Plus. Phablets are defined by their size, with the Samsung Galaxy Note (5.3 inch screen size) and iPhone 6 Plus (5.5 inch screen size) being typical of the genre.

Despite their large size, users often still wish to operate, i.e., to hold and control, phablet-size devices in the same way they do with smartphones having a smaller size, which is holding the device and operating the touchscreen using the same hand, herein also referred to as single-handed operation. This may be achieved by manually shifting the position of the device within the hand using a 'shuffle' motion, thus moving the 'touch finger' closer to a region of the screen which the user intends to touch. For instance, users may use one finger (most often the middle finger) placed on the rear face of the device to hold the device steady, and then rock or tilt the device using other fingers (most often the first and a combination of the fourth and the little finger) to allow the touching finger (most often the thumb) to touch the screen. Alternatively, users may use the second or the fourth finger on the rear face of the device to hold the device, and these fingers plus the little finger, which is placed on the bottom side of the device, rock the device back and forth whilst the touchscreen is operated by the thumb. However, moving the device in this manner requires a level of dexterity to perform without dropping the device. Even when performed safely, it is a slow and frustrating user interaction.

It is physically difficult for most people to operate a phablet-size device in a stable manner, i.e., to statically hold the device with a single hand and being able to reach all areas of the touchscreen to control the device. Unstable operation of the device may lead to either difficulty in interacting with the touchscreen or, in the worst case, dropping the device. Hence, solutions are required to enable single-handed operation of such devices.

A known solution is the use of a user-interface control which 'shifts' the user interface displayed on the touchscreen such that user-interface elements at the top of the screen come within reach of the touching finger, such as Apple's 'Reachability' one-hand mode. However, these solutions suffer from being less intuitive for users, in addition to reducing the usable screen size.

SUMMARY

It is an object of the invention to provide an improved alternative to the above techniques and prior art.

More specifically, it is an object of the invention to provide solutions for a more stable operation of handheld devices, such as mobile phones, mobile terminals, smartphones, User Equipments (UEs), tablets, phablets, media players, remote controls, or gaming consoles. In particular, it is an object of the invention to provide solutions for devices having an increased form factor, commonly known as 'phablets'. In the present context, operating a handheld device is to be understood as holding and controlling the device by one or more hands of a user of the device. Further, operating a handheld device is considered stable if the user is able to control the device, by pressing buttons or touching a touchscreen of the device, with little or no risk of inadvertently dropping the device. Correspondingly, operating a handheld device is considered unstable, or not stable, if the user does not have a firm grip of the device. For instance, unstable operation may be characterized by the user dropping the device or risking to drop the device.

These and other objects of the invention are achieved by means of different aspects of the invention, as defined by the independent claims. Embodiments of the invention are characterized by the dependent claims.

According to a first aspect of the invention, a device for handheld operation is provided. The device is operative to detect an indication of an unstable operation of the device when being held by a hand of a user of the device, and, in response thereto, to increase a grip between an outer surface of the device and one or more fingers of the hand.

According to a second aspect of the invention, a method of a device for handheld operation is provided. The method comprises detecting an indication of an unstable operation of the device when being held by a hand of a user of the device, and, in response thereto, increasing a grip between an outer surface of the device and one or more fingers of the hand.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

The invention makes use of an understanding that an improved stability in operating a handheld device, which is held by a hand of a user of the device, can be achieved by detecting an indication of an unstable operation of the device and, in response thereto, initiating countermeasures to support a more stable operation of the device using a hand of the user. In particular, a more stable operation is achieved by increasing a grip between an outer surface of the device and one or more fingers of the hand. The detected indication of an unstable operation may be an indication of an imminent unstable operation of the device, i.e., the device responds proactively by increasing the grip. Alternatively, the detected indication may be an indication of a prevailing unstable operation of the device, i.e., the device detects an actual unstable operation and responds reactively. In particular, it may be an indication of an unstable operation of the device when being held and operated by a single hand of the user, i.e., the device is held and operated single-handedly. The grip may be increased for the entire outer surface or a part thereof. In particular, one or more dedicated regions of the outer surface may be configured with adjustable grip.

Embodiments of the invention are advantageous in that the risk for dropping the device during handheld operation is mitigated or at least reduced. Moreover, an improved user experience is provided, as the user operating the device is relieved from manually shifting the position of the device so as to reach user-interface elements which otherwise are difficult to reach. Advantageously, the user of the device can adopt finger positions which would otherwise lead to an increased risk of the device being dropped.

According to an embodiment of the invention, one or more pivot fingers of the hand are determined, and the grip is increased between the outer surface of the device and the one or more pivot fingers. The pivot finger or fingers is/are the finger(s) around which the device rocks and/or rotates when being operated by one or more hands of the user. In other words, the pivot finger(s) is/are rather static, i.e., it/they has/have a static position relative to the outer surface of the device.

According to an embodiment of the invention, the grip is increased between a rear face of the device, or a part thereof, and the one or more fingers. Optionally, the grip may additionally be increased between one or more side faces of the devices and the one or more fingers. This is advantageous if one or more fingers of the hand are placed at the outer edge of the device when being operated.

According to an embodiment of the invention, the grip is increased between a part of the outer surface of the device and the one or more fingers. In particular, the grip may be increased between a part of the outer surface which is in contact with the one or more fingers. That is, the grip is increased only where the one or more fingers, or the pivot fingers, touch the device.

According to an embodiment of the invention, the grip is increased by generating an adhesive force between the outer surface and the one or more fingers. This may, e.g., be achieved by providing the device with an outer surface with controllable adhesion. For instance, adhesion may be created through use of microscopic pillars, similar to those found on a gecko's foot, which bond with a surface due to Van der Waals forces in a controllable manner.

According to another embodiment of the invention, the grip may be increased by increasing a friction between the outer surface and the one or more fingers. This may, e.g., be achieved by providing the device with a haptic outer surface which is based on electrostatic or ultrasonic forces, or by creating a vacuum between the outer surface and the one or more fingers, for increasing a coefficient of friction of the outer surface.

According to an embodiment of the invention, the indication is a characteristic motion of the device, such as a change in position and/or orientation, or an acceleration of the device, which is associated with unstable operation, i.e., is known as a signature of an actual unstable operation or a precursor of unstable operation.

According to an embodiment of the invention, the indication is a software application, such as an app, which is executed by the device, e.g., by a processing unit comprised in the device, and which is associated with unstable operation, i.e., is known as a signature of an actual unstable operation or a precursor of unstable operation.

According to an embodiment of the invention, the indication is an activity of the user which is associated with unstable operation, i.e., is known as a signature of an actual unstable operation or a precursor of unstable operation.

According to an embodiment of the invention, the indication is a prevailing operational mode of the device, e.g., an ongoing chat session, which operational mode is associated with unstable operation, i.e., is known as a signature of an actual unstable operation or a precursor of unstable operation.

According to an embodiment of the invention, the indication is a configuration of the fingers of the hand holding the device, also referred to as grip signature, which is associated with unstable operation, i.e., is known as a signature of an actual unstable operation or a precursor of unstable operation.

According to an embodiment of the invention, the indication is a layout of user-interface elements displayed on the screen, which layout is associated with unstable operation, i.e., is known as a signature of an actual unstable operation or a precursor of unstable operation.

According to an embodiment of the invention, the indication is an instruction from the user to increase the grip. That is, rather than detecting the need for an increased grip, the device increases the grip in response to an explicit instruction received from the user.

According to an embodiment of the invention, the device is further operative to detect an indication of a stable operation of the device when being held by the hand, and, in response thereto, decrease the grip between the outer surface of the device and the one or more fingers. This is advantageous in that the device can increase the grip when needed, and subsequently decrease the grip when the device can be operated in a stable manner, i.e., when there is no indication of an unstable operation of the device when being held by the hand.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 6 shows a flow chart illustrating the method of a device for handheld operation, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
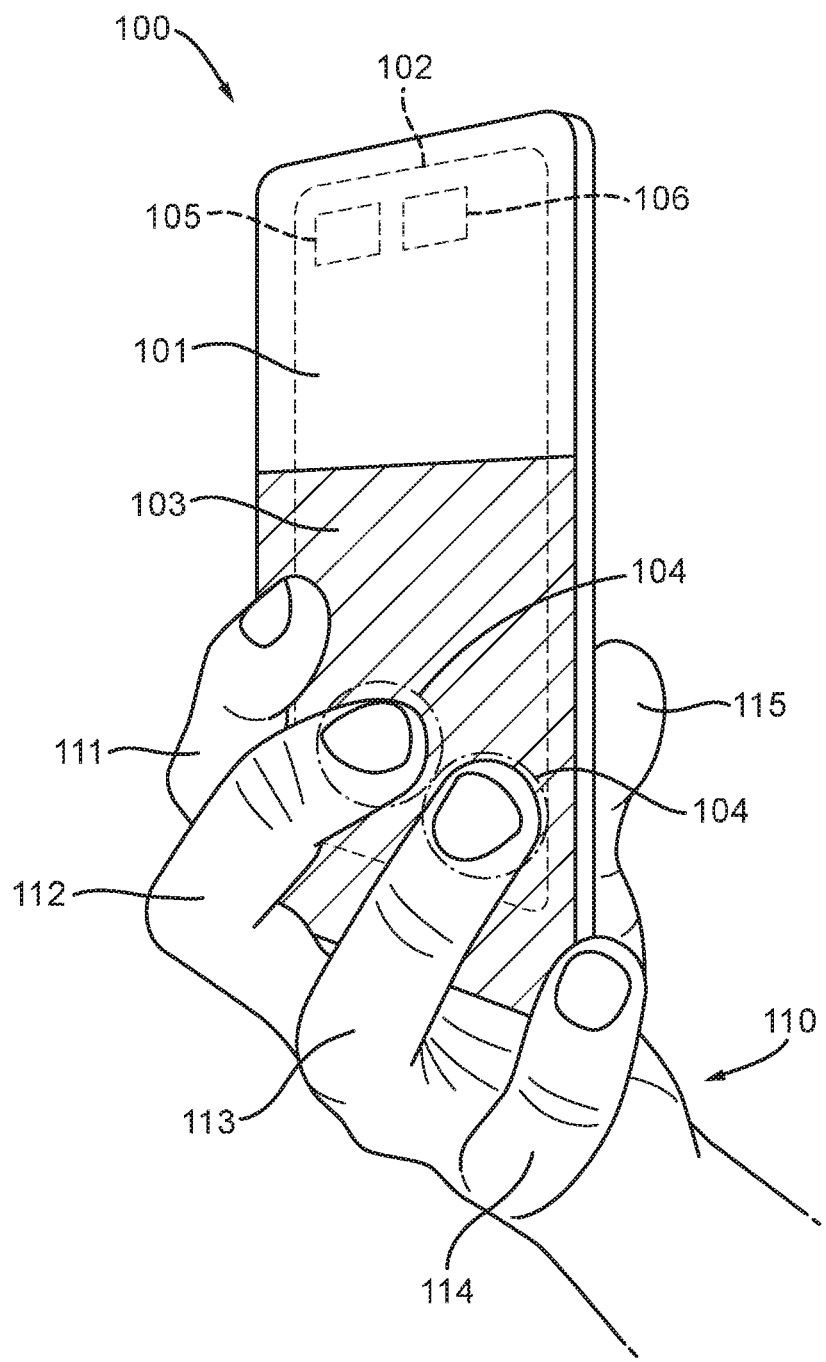
FIG. 1 illustrates single-handed operation of a phablet-sized device, in accordance with an embodiment of the invention.

In FIG. 1, an embodiment 100 of the device for handheld operation is shown. Device 100 is illustrated has a mobile phone, or smartphone, having a form factor typical for a class of devices colloquially termed 'phablets', with the Samsung Galaxy Note (5.3 inch screen size) and the iPhone 6 Plus (5.5 inch screen size) being typical of the genre. In general, device 100 may be any one of a mobile phone, a mobile terminal, a smartphone, a UE, a tablet, a phablet, a media player, a remote control, and a gaming console.

Device 100 comprises a touchscreen 102 providing a touch-based user interface to a user of device 100 for the purpose of controlling and inputting information to device 100 by touches or gestures made by touching touchscreen 102, and processing means 105 arranged to control device 100 so as to implement embodiments of the invention described herein. In addition, device 100 may comprise other units or modules, such as a communications interface for effecting wireless communications over a cellular network, e.g., a Global System for Mobile Communications (GSM) network, a Universal Mobile Telecommunications System (UMTS) network, a Long Term Evolution (LTE) network, or a 5G network, or a WiFi/Wireless Local Area Network (WLAN).

In FIG. 1, device 100 is shown as comprising a grip surface 103 covering a lower part of the rear face 101 of device 100, which is a region where users typically place one or more fingers 111-114 of their hand 110 to hold device 100 while operating it with one or more fingers, e.g., thumb 115 if device 100 is operated single-handedly. Grip surface 103 is a part of rear face 101 of device 100 which is arranged to change a grip between an outer surface of device 100 and fingers 111-114 in a controllable manner. It will be appreciated that embodiments of the invention are not limited to the specific size and/or arrangement of grip surface 103, but may comprise any number, form, or extent, of outer surfaces, or parts thereof, providing a controllable grip.

To this end, device 100 is operative to detect an indication of an unstable operation of device 100 when being held by a hand 110 of a user of device 100, and, in response thereto, to increase a grip between an outer surface 103 of device 100 and one or more fingers 111-114 of hand 110.

Device 100 may be operative to detect an indication of an imminent, or impending, unstable operation of the device. In other words, device 100 detects a sign of, or a risk for, an unstable operation and responds proactively by increasing the grip between grip surface 103 and fingers 111-114, thereby mitigating, or at least reducing, the risk for an unstable operation. As a result of the increased grip, the user can maintain a firm grip of device 100 with hand 110, owing to one or more fingers 111-114 'sticking' to an adhesive grip surface 103 and/or being less prone to 'slip' across grip surface 103 having an increased friction coefficient.

Device 100 may in addition, or alternatively, be operative to detect an indication of a prevailing, or actual, unstable operation of the device and respond reactively by increasing the grip between grip surface 103 and one or more fingers 111-114, thereby reducing the risk that device 100 is being dropped and preferably stabilizing the position and/or orientation of device 110 with respect to hand 110. This results in a more convenient operation of device 100, as the user operating device 100 is relieved from manually shifting the position of device 100 so as to reach user-interface elements displayed on touchscreen 102 which otherwise are difficult to reach, thereby improving user experience.

Grip surface 103 may be based on any technology which is suitable for adjusting the grip between the outer surface of device 100 and one or more fingers 111-114 in a controllable manner. For instance, grip surface 103 may comprise an adhesive surface providing a controlled level of adhesion. Such as controllable adhesive grip surface 103 may, e.g., be realized by means of microscopic pillars, similar to those found on a gecko's foot, which bond to the outer surface of device 100 due to Van der Waals forces [V. Bandmann, R. Hensel, K. Moh, E. Arzt, "Das Gecko Prinzip: Bioinspirierte Haftsysteme für die Industrielle Anwendung", GIT Labor-Fachzeitschrift 59, pages 55-57, 2015; H. K. Minsky and K. T. Turner, "Achieving enhanced and tunable adhesion via composite posts", Applied Physics Letters, vol. 106, 201604, 2015; E. W. Hawkes, D. L. Christensen, A. K. Han, H. Jiang, and M. R. Cutkosky, "Grasping without squeezing: Shear adhesion gripper with fibrillar thin film", 2015 IEEE International Conference on Robotics and Automation (ICRA), Seattle, Wash., May 26-30, 2015].

As an alternative, grip surface 103 may comprise a haptic surface providing a controllable friction coefficient. Such a controllable haptic surface may, e.g., be realized by means of electrovibration to control electrostatic friction between grip surface 103 and one or more fingers 111-114. This may be realized by utilizing a technology similar to that used for capacitive-based touch sensing [O. Bau, I. Poupyrev, A. Israr, and C. Harrison, "TeslaTouch: Electrovibration for Touch Surfaces", ACM Symposium on User Interface Software and Technology (ACM UIST), ACM Press, 2010, pages 283-292]. More specifically, a transparent electrode applied onto an outer surface of device 100, such as grip surface 103, and coated with an insulator layer may be excited with a periodic electrical signal of an amplitude which is sufficient to induce an attractive force between the electrode and a finger 111-114 sliding over the electrode, thereby increasing the dynamic friction between the finger and grip surface 103. The friction can be controlled by modulating the amplitude and frequency of the applied signal.

As an alternative, ultrasonic forces may be utilized [M. Biet, F. Giraud, and B. Lemaire-Semail, "Implementation of tactile feedback by modifying the perceived friction", The European Physical Journal Applied Physics, vol. 43, pages 123-135, 2008]. More specifically, this may be achieved by means of a stator of an ultrasonic motor which is operated so as to create a slippery feeling on the stator's surface. This effect is able to decrease the friction coefficient between the stator and a finger touching the stator as a function of the stator's vibration amplitude. Accordingly, the friction coefficient of grip surface 103 may be increased by reducing the above effect.

As a further alternative, a vacuum may be created between the outer surface of device 100 and fingers 111-114

[T. Hachisu and M. Fukumoto, "VacuumTouch: attractive force feedback interface for haptic interactive surface using air suction", CHI '14 Proceedings of the SIGCHI Conference on Human Factors in Computing Systems, pages 411-420, 2014]. More specifically, this may be achieved by means of an air pump and air valves which connect to grip surface 103. The solenoid air valves are controlled to suck the air above grip surface 103 where fingers 111-114 touch device 100 so as to increase the grip.

It will be appreciated that device 100 may be operative to increase the grip over its entire outer surface, one of its faces, such as rear face 101 and/or one or more side faces of device 100, or one or more parts of its outer surface or faces, such as grip surface 103. In particular, device 100 may be operative increase the grip for a part or parts 104 of the outer surface of device 100 which is/are in contact with one or more fingers 111-114, as is illustrated in FIG. 1. That is, the grip is increased only where fingers 112 and 113 touch device 100. To accomplish this, device 100 detects the positions of fingers 112 and 113 and controls grip surface 103 to increase the grip in regions 104 around fingers 112 and 113.

Device 100 may additionally be operative to determine one or more pivot fingers of fingers 111-114. The pivot finger or fingers is/are the finger(s) around which device 100 rocks and/or rotates when being operated by one or more hands of the user. In other words, the pivot finger(s) is/are rather static, i.e., it/they has/have a static position relative to the outer surface of the device. With reference to FIG. 1, fingers 112 and 113 may, e.g., be pivot fingers, characterized in that their positions relative to grip surface 103 are substantially static. The pivot fingers may be determined by detecting the respective positions of fingers 111-114 on grip surface 103, and optionally other surfaces of device 100, and monitoring the change of their respective positions over time. More specifically, one or more of fingers 111-114 may be identified as being pivot fingers if their absolute change in position is less than a threshold value during a time interval ranging from a fraction of a second to a few seconds. It will be appreciated that the threshold value for the absolute change in position and/or the time interval may, e.g., be configured by a user or manufacturer of device 100. As an alternative, a threshold value for the absolute change in position and/or the time interval may be learned based on analyzing the changes in positions over an extended time interval. As yet a further alternative, the user holding device 100 may indicate one or more of fingers 111-114 as being pivot fingers by tapping, double-tapping, or by means of any other suitable gesture, pivot fingers 112 and 113 against grip surface 103. In response to determining one or more pivot fingers 112 and 113, the grip is increased between grip surface 103 and pivot fingers 112 and 113. That is, the grip is only increased for a part of grip surface 103, more specifically for regions 104.

In the following, different alternatives for detecting an unstable operation of device 100, when being held by hand 110, are described. It will be appreciated that embodiments of the invention may also implement two or more of the described alternatives in combination.

For instance, the indication of an unstable operation of device 100 may be a characteristic motion of device 100, which is associated with, i.e., known to result in or to be a precursor of, unstable operation. To this end, device 100 may comprise one or more motion sensors 106, such as accelerometers, gyroscopes, magnetoresistive sensors, or the like, which provide sensor data pertaining to the position or orientation of device 100, a change thereof, or an acceleration of the device. By means of analyzing the sensor data, e.g., by comparing sensor data to threshold values, an indication of an unstable operation may be detected. For instance, such an indication of unstable operation may be acceleration values exceeding an acceleration threshold value. Alternatively, the characteristic motion may also be learned, e.g., by learning that certain motion patterns, which may be obtained by analyzing the sensor data, are correlated with an increased risk of the user dropping device 100. As a further alternative, device 100 may detect that the user is running while holding device 100. Device 100 may maintain a list of threshold values, motion patterns, or motion signatures, which are known to be associated with unstable operation. Such a list may, e.g., be configured by the user or the device manufacturer, or learned, e.g., by learning that certain motion patterns are correlated with the user dropping device 100.

Alternatively, the indication of unstable operation of device 100 may be an application, i.e., a software, a program, or an app, executed by device 100, which is associated with, i.e., is known to result in or to be a precursor of, unstable operation. This may, e.g., be applications which require frequent manual interaction by the user with device 100, such as typing on a physical or virtual keyboard. For instance, such application may, e.g., be any one of an email application, a text-editor application, a drawing application, or the like. Device 100 may maintain a list of applications which are known to be associated with unstable operation. The list may either be configured by the user or the device manufacturer, or learned, e.g., by learning that certain applications are, when being active or in focus, correlated with the user dropping device 100.

As a further alternative, the indication of unstable operation of device 100 may be an activity of the user which is associated with, i.e., known to result in or to be a precursor of, unstable operation, such as inputting data using a physical or virtual keyboard. Device 100 may maintain a list of activities which are known to be associated with unstable operation. The list may either be configured by the user or the device manufacturer, or learned, e.g., by learning that certain activities are correlated with the user dropping device 100.

As a further alternative, the indication of unstable operation may be prevailing operational mode of the device, which is associated with, i.e., known to result in or to be a precursor of, unstable operation, such as an ongoing chat session. Device 100 may maintain a list of operational modes which are known to be associated with unstable operation. The list may either be configured by the user or the device manufacturer, or learned, e.g., by learning that certain operational modes applications are correlated with the user dropping device 100.

Figure 2:
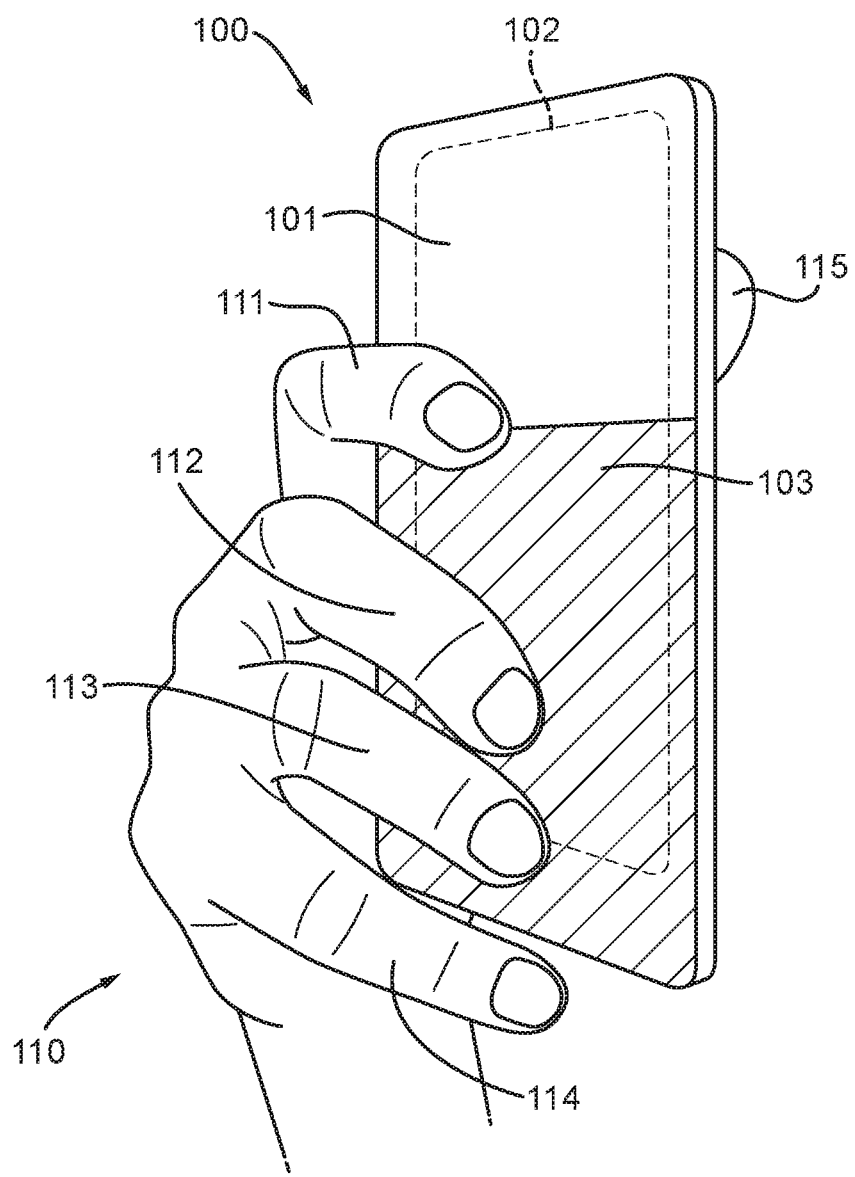
FIG. 2 illustrates a configuration of fingers which is associated with unstable single-handed operation of a phablet-sized device, in accordance with another embodiment of the invention.

As a further alternative, the indication of unstable operation of device 100 may be a configuration of fingers 111-114 which is associated with, i.e., known to result in or to be a precursor of, unstable operation. This may be achieved by detecting the respective positions of fingers 111-114 relative to the outer surface of device 100, e.g., grip surface 103, and comparing the one or more positions of fingers 111-114, and in particular the relative arrangement of fingers 111-114, with a list of finger configurations, also termed grip signatures, stored by device 100 and which are known to be associated with unstable operation. The list of finger configurations may either be configured by the user or the device manufacturer, or learned, e.g., by learning that certain grip signatures are correlated with the user dropping device 100. This is illustrated in FIG. 2, which shows device 100 being held by hand 110 in a different manner than what is shown in FIG. 1. The finger configuration shown in FIG. 1 may, e.g., be associated with a stable operation of device 100, whereas the finger configuration shown in FIG. 2 is associated with an unstable operation of device 100. Accordingly, device 100 is operative to track the respective positions of fingers 111-114 and compare these positions, or the relative arrangement of fingers 111-114, to a list of stored finger configurations. If a finger configurations is detected which is associated with an unstable operation of device 100, the grip is increased.

As a further alternative, the indication of an unstable operation of device 100 may also be a layout of user-interface elements displayed on touchscreen 102, which layout is associated with, i.e., known to result in or to be a precursor of, unstable operation. In the present context, user-interface elements may, e.g., be images, pieces of text, fields for entering or editing text, Uniform Resource Locators (URLs) or other links, virtual buttons or keys, and so forth, which are displayed by touchscreen 102 for the purpose of conveying information to, or receiving information from, a user of device 100. In particular, user-interface elements may be used for controlling device 100, e.g., by touching virtual buttons or entering text in a text field. Device 100 may maintain a list of layouts of user-interface elements which are known to be associated with unstable operation. The list may either be configured by the user or the device manufacturer, or learned, e.g., by learning that certain layouts of user-interface elements are correlated with the user dropping device 100.

Figure 3:
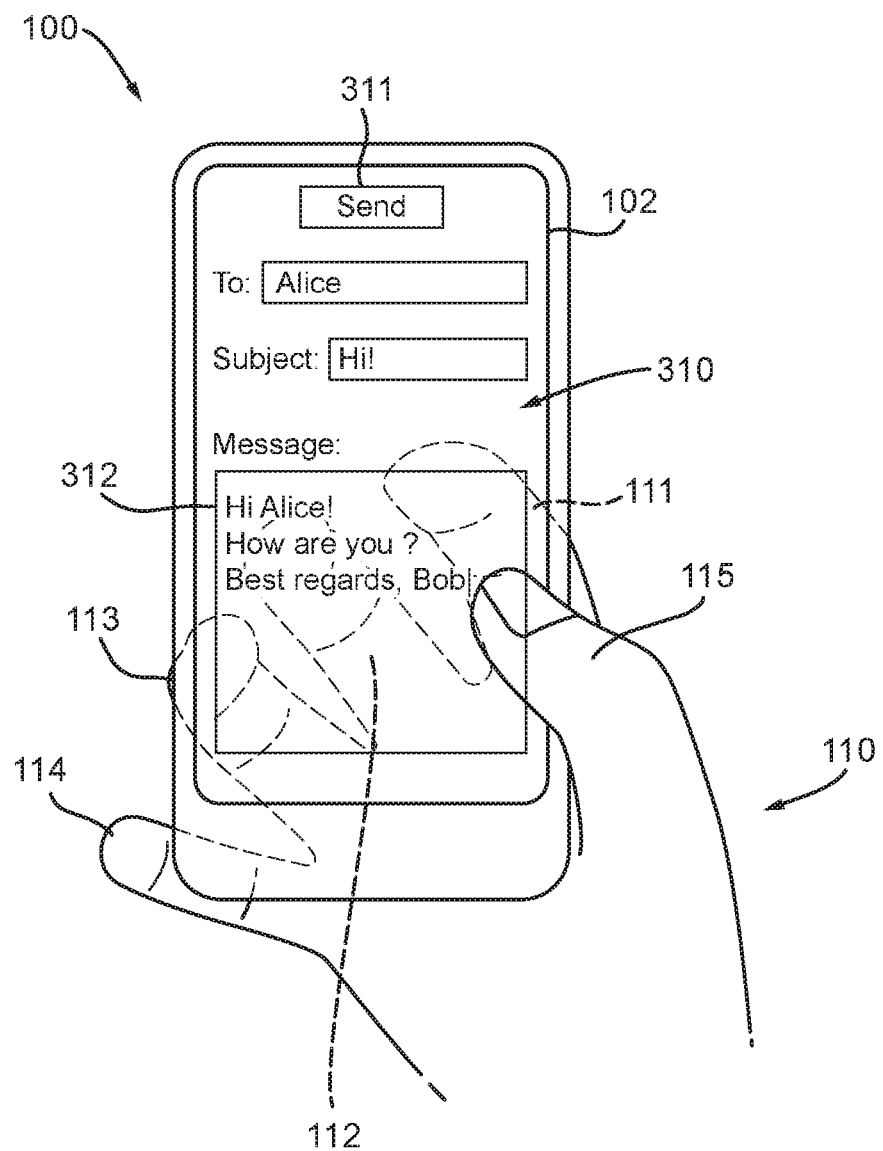
FIG. 3 illustrates a layout of user-interface elements which is associated with unstable single-handed operation of a phablet-sized device, in accordance with an embodiment of the invention.

As an example, device 100 is in FIG. 3 illustrated as displaying a layout 310 of user-interface elements on touchscreen 102 which is typical for a messaging application, such as an email application, an SMS application, or the like. Layout 310 comprises a 'Send'-button 311 and an editable text field 312 in which the user can enter the message text, and may comprise additional user-interface elements such as a field for selecting the recipient of the message, a text field for the message subject, and the like. To this end, device 100 may be operative to determine that the user is about to finish writing the message text, e.g., by detecting that the user types his/her typical sign-off in text field 312, such as 'Best regards, Bob', and in response thereto increase the grip between an outer surface of device 100, such as grip surface 103, and fingers 111-114. That is, the knowledge about the layout of displayed user-interface elements, preferably in combination with detecting an interaction with one or more of the displayed user-interface elements, such as the sign-off being typed in text field 312, is used as an indication of unstable operation. For the example illustrated in FIG. 3, this is the case since it is difficult for the user to reach 'Send'-button 311 with thumb 115, as 'Send'-button 312 is displayed in a location on touchscreen 102 which is difficult to reach with thumb 115 and requires the user to adopt an unstable grip of device 100.

As a further alternative, the indication of an unstable operation of device 100 may also be an instruction from the user to increase the grip. For instance, the instruction may be a gesture (detected by a built-in camera or infrared sensor of device 100), a spoken instruction (received by a natural-language user-interface of device 100, like Apple's Siri), a characteristic motion of device 100, e.g., tilting device 100 back-and-forth (detected by motion sensor(s) 106), squeezing device 100 with fingers 111-114 placed on either side of device 100 (detected by pressure sensors which device 100 is provided with), double-tapping on rear face 101 of device 100 (detected by pressure sensors which device 100 is provided with), or the user touching a butting displayed on touchscreen 102.

Optionally, device 100 may further be operative to detect an indication of a stable operation of device 100 when being held by hand 110, and in response thereto, decrease the grip between the outer surface of device 100, e.g., grip surface 103, and one or more fingers 111-114. Advantageously, the grip between device 100 and fingers 111-114 is increased in the event of unstable operation, and decreased when device 100 can be operated in a stable manner. In particular, the grip may be decreased, or released, when there is no indication of an unstable operation of device 100 when being held by hand 110.

In the following, embodiments of processing means 105 are described with reference to FIGS. 3 and 4. Processing means 105 is arranged to control device 100 so as to implement embodiments of the invention described herein.

Figure 4:
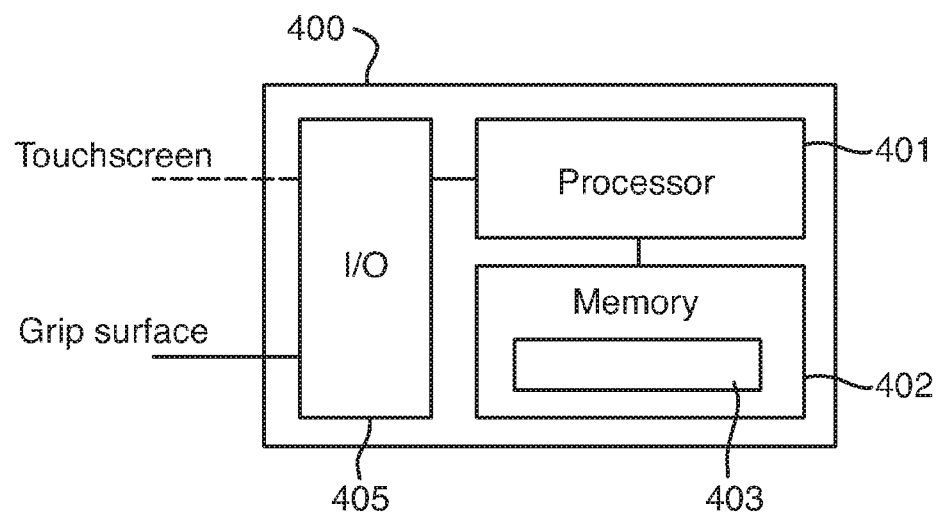
FIG. 4 shows an embodiment of the processing means comprised in the device for handheld operation.

FIG. 4 shows an embodiment 400 of processing means 105, comprising a processing unit 401, such as a general purpose processor, and a computer-readable storage medium 402, such as a Random Access Memory (RAM), a Flash memory, or the like. In addition, processing means 400 comprises one or more interfaces 405 ('I/O' in FIG. 4) for controlling and/or receiving information from grip surface 103 and, optionally, touchscreen 102, a communications interface, or the like. In particular, interfaces 405 may be arranged for controlling the grip between grip surface 103 and fingers 111-114 and, optionally, receiving information pertaining to respective positions of fingers 111-114 touching grip surface 103. Memory 402 contains computer-executable instructions 403, i.e., a computer program, for causing device 100 to perform in accordance with embodiments of the invention as described herein, when computer-executable instructions 403 are executed on processing unit 401.

Figure 5:
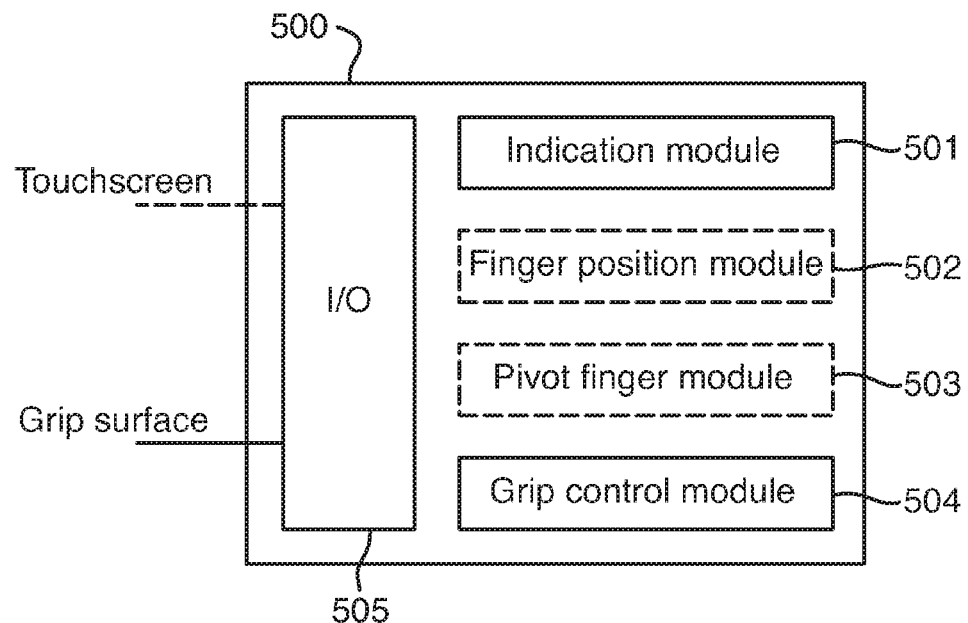
FIG. 5 shows another embodiment of the processing means comprised in the device for handheld operation.

FIG. 5 shows an alternative embodiment 500 of processing means 105, comprising an indication module 501 for detecting an unstable operation of device 100 when being held by hand 110 of a user of device 100, and a grip control module 504 for, in response to detecting an unstable operation, increasing a grip between an outer surface of device 100, such as grip surface 103, and one or more fingers 111-114. In addition, processing means 500 comprises one or more interfaces 505 ('I/O' in FIG. 5) for controlling and/or receiving information from grip surface 103 and, optionally, touchscreen 102, a communications interface, or the like. In particular, interfaces 505 may be arranged for controlling the grip between grip surface 103 and fingers 111-114 and, optionally, receiving information pertaining to respective positions of fingers 111-114 touching grip surface 103. Optionally, processing means 500 may further comprise finger position module 502 for determining the respective positions of one or more fingers 111-114 touching grip surface 103, or any other outer surface of device 100. Further optionally, processing means 500 may comprise pivot finger module 503 for determining one or more pivot fingers 111-114, as is described hereinbefore. Indication module 501, finger position module 502, pivot finger module 503, and grip control module 504, and additional modules which processing means 500 may comprise, are configured to perform in accordance with embodiments of the invention as described herein. Modules 501-505, as well as any additional modules comprised in processing means 500, may be implemented by any kind of electronic circuitry, e.g., any one, or a combination of, analogue electronic circuitry, digital electronic circuitry, and processing means executing a suitable computer program.

In the following, embodiments of the method of a device for handheld operation are described with reference to FIG. 6.

Method 600 comprises detecting 601 an indication of an unstable operation of the device when being held by a hand of a user of the device, and in response thereto, increasing 604 a grip between an outer surface of the device and one or more fingers of the hand. In particular, the detected indication may be an indication of an unstable operation of the device when being held and operated by a single hand of the user. The detected indication may, e.g., be an indication of an imminent unstable operation of the device. Alternatively, the detected indication may be an indication of a prevailing unstable operation of the device.

The grip may, e.g., be increased 604 by generating an adhesive force between the outer surface and the one or more fingers. Alternatively, the grip may be increased by increasing a friction between the outer surface and the one or more fingers. The grip may, e.g., be increased between a rear face of the device and the one or more fingers. Optionally, the grip may be increased between a part of the outer surface of the device, which part of the outer surface is in contact with the one or more fingers, and the one or more fingers.

The detected 601 indication may, e.g., be a characteristic motion of the device, which characteristic motion is associated with unstable operation. Alternatively, the indication may be an application which is executed by the device, which application is associated with unstable operation. As a further alternative, the indication may be an activity of the user, which activity is associated with unstable operation. As a further alternative, the indication may be a prevailing operational mode of the device, which operational mode is associated with unstable operation. As a further alternative, the indication may be a configuration of the fingers of the hand, which configuration is associated with unstable operation. As a further alternative, the indication may be a layout of user-interface elements displayed on a screen of the device, which layout is associated with unstable operation. As a further alternative, the indication may be an instruction from the user to increase the grip. Embodiments of method 600 may further implement two or more of the alternatives described hereinbefore in combination.

Optionally, method 600 may further comprise determining 602 respective positions of the one or more fingers touching grip surface 103, or any other outer surface of the device.

Optionally, method 600 may comprise determining 603 one or more pivot fingers of the hand, wherein the grip is increased between the outer surface of the device and the one or more pivot fingers.

Optionally, method 600 may comprise detecting 605 an indication of a stable operation of the device when being held by the hand, and, in response thereto, decreasing 506 the grip between the outer surface of the device and the one or more fingers.

It will be appreciated that method 600 may comprise additional, or modified, steps in accordance with what is described throughout this disclosure. Method 600 may be performed by a device for handheld operation, such as a mobile phone, a mobile terminal, a smartphone, a UE, a tablet, a phablet, a media player, a remote control, or a gaming console. An embodiment of method 600 may be implemented as software, such as computer program 403, to be executed by a processing unit comprised in the device for handheld operation, whereby the device is operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A device for handheld operation, the device comprising:
   a touchscreen configured to provide a touch-based user interface to a user of the device; and
   processing circuitry configured to:
      detect a trigger condition that is predefined or learned as corresponding to an increased risk of the user dropping the device; and
      responsive to detection of the trigger condition, actuate an electrically-actuated system in the device that is operative to increase a grip of one or more grip surfaces of the device.

2. The device according to claim 1, wherein the trigger condition is the device being held and operated by a single hand of the user.

3. The device according to claim 1, wherein the device includes an accelerometer operatively associated with the processing circuitry and wherein the trigger condition is a sensed acceleration of the device exceeding a threshold value.

4. The device according to claim 1, wherein the device includes a motion sensor and wherein the trigger condition is a detected pattern of motion of the device.

5. The device according to claim 1, wherein the processing circuitry is operative to identify one or more fingers of the user that are in contact with at least one of the one or more grip surfaces of the device as pivot fingers, and wherein the processing circuitry is configured to increase the grip at least at those portions of the one or more grip surfaces corresponding to the identified pivot fingers.

6. The device according to claim 1, wherein the one or more grip surfaces comprise at least a rear surface of the device, away from the touchscreen.

7. The device according to claim 1, wherein the device includes one or more sensors operative to detect contact by fingers of the user with corresponding portions of the one or more grip surfaces, and wherein the processing circuitry is configured to increase the grip of at least the corresponding portions of the one or more grip surfaces.

8. The device according to claim 1, wherein the electrically-actuated system is configured to change a coefficient of friction of the one or more grip surfaces, and wherein the processing circuitry is configured to increase the grip of the one or more grip surfaces by controlling the electrically-actuated system to increase the coefficient of friction of the one or more grip surfaces.

9. The device according to claim 8, wherein the electrically-actuated system is configured to increase a static coefficient of friction of the one or more grip surfaces.

10. The device according to claim 1, wherein the trigger condition is a characteristic motion of the device, as detected by the processing circuitry via sensor signals provided by one or more motion sensors included in the device.

11. The device according to claim 1, wherein the trigger condition is execution of an application by the device, which application is predefined or learned as corresponding to an increased risk of the user dropping the device.

12. The device according to claim 1, wherein the trigger condition is a detected physical activity of the user, which physical activity is predefined or learned as corresponding to an increased risk of the user dropping the device.

13. The device according to claim 1, wherein the trigger condition is a detected configuration of the fingers of the user that are being used to hold the device, which configuration is predefined or learned as corresponding to an increased risk of the user dropping the device.

14. The device according to claim 1, wherein the trigger condition indication is a layout of user-interface elements displayed on the touchscreen that is predefined or learned as corresponding to an increased risk of the user dropping the device.

15. The device according to claim 1, wherein the processing circuitry is further configured to increase the grip of one or more grip surfaces of the device responsive to an instruction input from the user.

16. The device according to claim 1, wherein the processing circuitry is configured to detect when the trigger condition is no longer fulfilled and, responsive to detecting that the trigger condition is no longer fulfilled, cease controlling the electrically-actuated system to increase the grip of the one or more grip surfaces.

17. The device according to claim 1, wherein the device comprises any one of a mobile phone, a mobile terminal, a smartphone, a User Equipment, a tablet, a phablet, a media player, a remote control, and a gaming console.

18. The device of claim 1, wherein the electrically-actuated system comprises a haptic surface control system that is configured to control one or more fibrillar thin films comprising all or a portion of the one or more grip surfaces of the device, the one or more fibrillar thin films having a controllable static coefficient of friction.

19. The device of claim 1, wherein the electrically-actuated system comprises one or more electrodes embedded in the one or more grip surfaces, the one or more electrodes configured to increase an electrostatic friction of the one or more grip surfaces.

20. A method of a device for handheld operation, the method comprising:
   detecting a trigger condition that is predefined or learned as corresponding to an increased risk of the user dropping the device; and
   responsive to detecting the trigger condition, controlling an electrically-actuated system in the device that is operative to increase a grip of one or more grip surfaces of the device.

21. The method according to claim 20, wherein the trigger condition is the device being held and operated by a single hand of the user.

22. The method according to claim 20, wherein the trigger condition is a sensed acceleration of the device exceeding a threshold value.

23. The method according to claim 20, wherein the trigger condition is a detected pattern of motion of the device.

24. The method according to claim 20, wherein the method includes identifying one or more fingers of the user that are in contact with the one or more grip surfaces as pivot fingers, and increasing the grip of the one or more grip surfaces at least at those portions of the one or more grip surfaces corresponding to the pivot fingers.

25. The method according to claim 20, wherein the one or more grip surfaces comprise at least a rear surface of the device, away from a touchscreen of the device.

26. The method according to claim 20, wherein the method includes detecting contact between fingers of the user and corresponding portions of the one or more grip surfaces, and wherein controlling the electrically-actuated system comprises controlling the electrically-actuated system to increase the grip of the one or more grip surfaces of the device at least at the corresponding portions where contact is detected.

27. The method according to claim 20, wherein the electrically-actuated system is configured to increase the static coefficient of friction of the one or more grip surfaces.

28. The method according to claim 20, wherein detecting the trigger condition comprises detecting a characteristic motion of the device that is predefined or learned as corresponding to an increased risk of the user dropping the device.

29. The method according to claim 20, wherein detecting the trigger condition comprises detecting execution of an application by the device, which application is predefined or learned as corresponding to an increased risk of the user dropping the device.

30. The method according to claim 20, wherein detecting the trigger condition comprises detecting a physical activity of the user that is predefined or learned as corresponding to an increased risk of the user dropping the device.

31. The method according to claim 20, wherein detecting the trigger condition comprises detecting a configuration of fingers of the user being used to hold the device, wherein configuration is predefined or learned as corresponding to an increased risk of the user dropping the device.

32. The method according to claim 20, wherein detecting the trigger condition comprises detecting a layout of user-interface elements displayed on a touchscreen of the device that is predefined or learned as corresponding to an increased risk of the user dropping the device.

33. The method according to claim 20, further comprising controlling the electrically-actuated system to increase the grip of the one or more grip surfaces of the device in response to an instruction input to the device by the user.

34. The method according to claim 20, further comprising detecting that the trigger condition is no longer fulfilled and, responsive to detecting that the trigger condition is no longer fulfilled, cease controlling the electrically-actuated system to increase the grip of the one or more grip surfaces.

35. The method according to claim 20, wherein the device comprises any one of a mobile phone, a mobile terminal, a smartphone, a User Equipment, a tablet, a phablet, a media player, a remote control, and a gaming console.

* * * * *